United States Patent [19]

Straub et al.

[11] 4,338,709
[45] Jul. 13, 1982

[54] MAGAZINE FOR STORING TOOLHOLDERS WITH TOOLS MOUNTED THEREIN FOR MACHINE TOOLS

[76] Inventors: Hans F. Straub, Nuberstr. 31, 7347 Bad Überkingen; Adalbert Kindermann, Schwabstr. 7, 7332 Eislingen/Fils; Friedrich Burkhardt, Brunnenweilerstr. 13, 7332 Eislingen/Fils; Hans Staiger, Oechslinstr. 32, 7320 Göppingen, all of Fed. Rep. of Germany

[21] Appl. No.: 35,058

[22] Filed: May 1, 1979

[51] Int. Cl.³ .............................................. B23Q 3/157
[52] U.S. Cl. ..................................... 29/26 A; 29/568; 211/1.5
[58] Field of Search ................ 29/26 A, 568; 211/1.5; 279/1 TS, 106

[56] References Cited

U.S. PATENT DOCUMENTS

| | | | |
|---|---|---|---|
| 3,277,568 | 10/1966 | Wetzel | 29/568 |
| 3,526,033 | 9/1970 | Saunders | 29/568 |
| 3,962,777 | 6/1976 | Stoilov | 29/568 |
| 4,173,817 | 11/1979 | Voglrieder et al. | 29/568 |

FOREIGN PATENT DOCUMENTS 2818092  10/1978  Fed. Rep. of Germany ........ 29/568

*Primary Examiner*—Z. R. Bilinsky
*Attorney, Agent, or Firm*—John C. Evans

[57] ABSTRACT

A machining center having a magazine for storing toolholders with tools mounted therein. The magazine includes a plurality of laterally open toolholder sockets for receiving one toolholder each with its axis parallel to the tool spindle axis of the machining center. Each toolholder socket on the magazine includes a locking member enabling the toolholder to be locked in its inserted position in the magazine thereby preventing accidental withdrawal of the toolholder during rotatable movement of the magazine. Each toolholder socket on the magazine includes flange members which engage the grooves on each toolholder thereby holding each toolholder in alignment enabling the correct position of each toolholder during transfer from the magazine to the spindle of the machining center.

4 Claims, 12 Drawing Figures

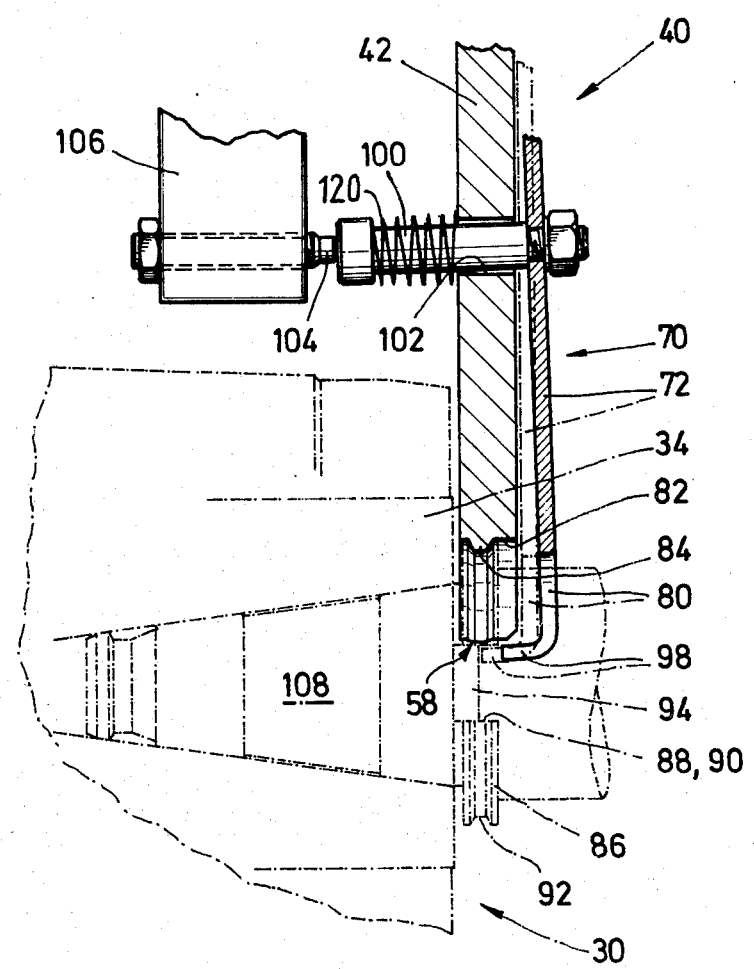

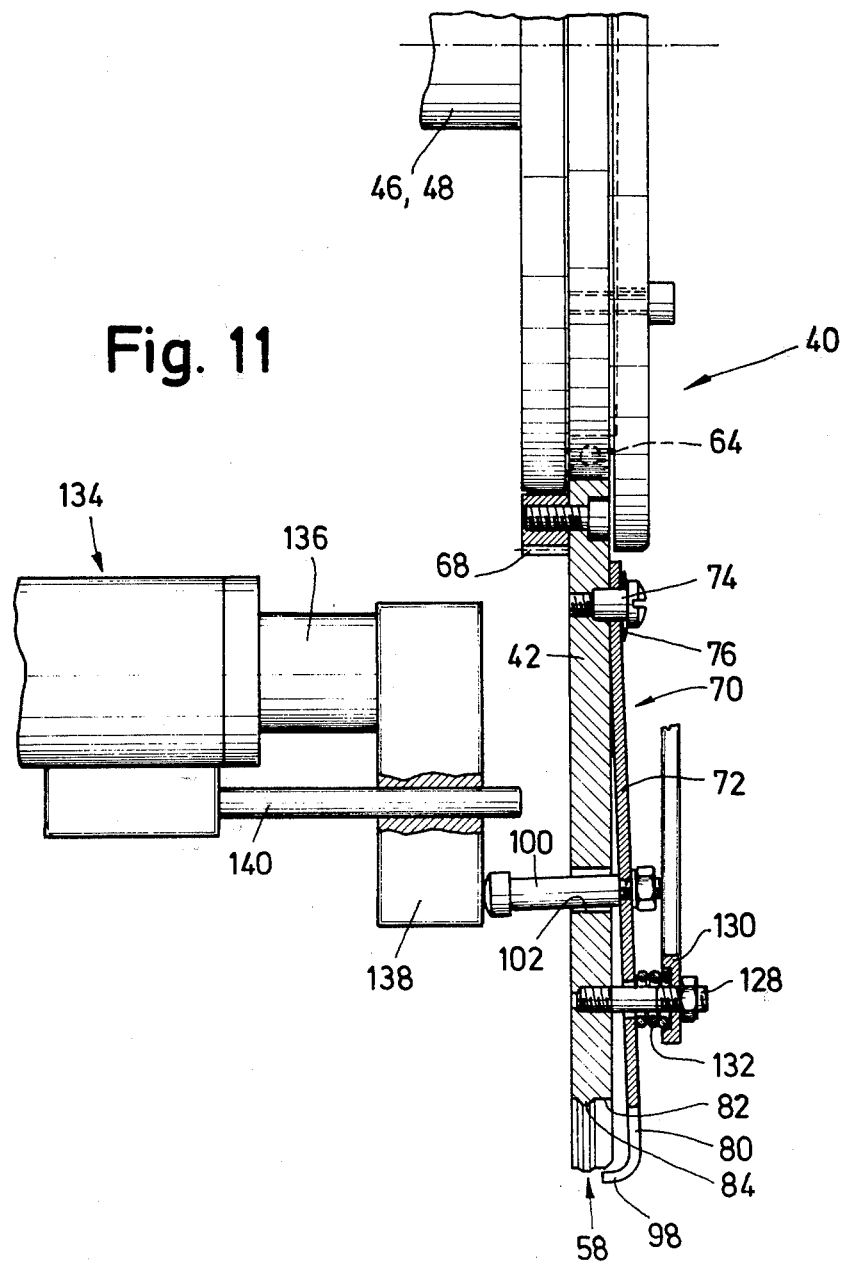

MAGAZINE FOR STORING TOOLHOLDERS WITH TOOLS MOUNTED THEREIN FOR MACHINE TOOLS

BACKGROUND AND SUMMARY OF INVENTION

The present invention relates to a magazine for storing toolholders with tools mounted therein for machine tools, in particular machining center type machines.

A magazine of this type has been known already as part of a machine tool (leaflet "Compact-Center nb-h 65 of Messrs. Hüller-Hille GmbH, Werkzeugmaschinend).

In this magazine, the toolholder support takes the form of a horizontally seated disk which has the toolholder sockets provided at its periphery. The sockets are open at the side, i.e. at the outer periphery.

The toolholders stored in the toolholder sockets are secured in the latter by means of one locking member each. For this purpose, the said locking members bear against a circumferencial portion of the toolholders projecting from the toolholder sockets.

The design and arrangement of the locking members is such that they are automatically held in their locking position and that only the toolholder which has been previously brought into a pre-determined changing position can be automatically released.

Such releasing is caused by a stop which is caused by the relative movement between the magazine disk and the tool spindle necessitated for the performance of a tool change to act upon the locking member and to move the latter into its releasing position.

In this known design, the locking members, due to the particular construction, project relatively far beyond the periphery of the magazine disk which may be disadvantageous, for instance if the arrangement is to be enclosed.

Moreover, the locking members must be provided at the toolholder support and/or the magazine disk between two neighbouring toolholder sockets, so that a relatively large mutual distance between the toolholder sockets becomes necessary.

Finally, the contact pressure exerted by the locking members upon the toolholders and required for centering the latter in the toolholder sockets is released already in the initial phases of the changing procedure, a fact which may impair the coaxial alignment between toolholder and tool spindle during the changing operation.

Now, it is an object of the present invention to provide a magazine in which the arrangement of the at least one locking member associated with the toolholder sockets eliminates the drawbacks of the known magazine construction.

This arrangement is to ensure that even large toolholders with their correspondingly heavy tools mounted therein will be held by the locking member at the toolholder support in perfectly aligned position during the changing operation until the drivers provided at the front face of the tool spindle engage positively the grooves in the periphery of the driver flange of a toolholder to be exchanged, thus assuming the function of aligning the toolholder to be exchanged coaxially in relation to the tool spindle, a function which had been performed to this moment by the locking member.

Accordingly, this problem is solved by having the locking members of the magazine construction of the invention, as well as their holders, arranged away from the periphery of the toolholder support.

The fact that the locking members engage the driver flange of the toolholders, preferably from the front face of the flange, creates the possibility to use the locking members both as aligning and retaining means. This offers the particular advantage of a perfect alignment and retention of the toolholders in the toolholder sockets of the toolholder support even when heavy tools are mounted therein and withdrawn by the tool spindle from the toolholder support, for instance from below.

In addition, contrary to the known construction, the individual locking mechanisms will work also when the toolholder support is not designed as a disk but for example as a longitudinal block arranged for linear movement in both the parallel and perpendicular directions relative to the tool spindle axis.

The locking member associated with each toolholder socket may for instance take the form of a cylindrical lug engaging a matching bore in the driver flange.

According to an advantageous improvement of the invention two locking holders per toolholder socket may be arranged on a common holder to engage oppositely arranged recesses in the flange.

In this case, no special recesses in the driver flange of the toolholders will be required when the locking members are matched in shape and dimensions to the grooves in the driver flange. Thus, it is possible to store in the magazine even tools already available in the shops without the need to change their driver flange in any manner whatever.

Furthermore, one holder may carry also the locking members of at least two neighbouring toolholder sockets so that the latter can be moved jointly into and/or out of their releasing position.

In a preferred embodiment of the invention, the toolholder support takes the form of a rotatable and at least axially displaceable toolholder disk arranged concentrically to the tool spindle. In this case, it is advantageous to have the locking members arranged at the holders of the individual toolholder sockets.

Also, it is advantageous in this case to give the end of the holders nearest the periphery of the disk the shape of a fork, so that the arms of the fork encompass a lateral portion of the toolholders present in the toolholder sockets. The locking members engaging the grooves of the driver flange of the toolholders to be locked may in this case be formed simply by bent-off endportions of the fork arms.

A second embodiment of the holder, the stop coacting with all stop members of any one holder may be provided in stationary arrangement at the machine frame in the vertical plane of movement of the tool spindle.

However, a particular advantage is provided by the arrangement and design of the stop. In this case, the holder is immediately released by the stop when the transfer of a toolholder from the toolholder support to the tool spindle has been completed so that the holder may immediately return into its waiting position in which the locking members are held in their locking position.

The design of the locking members ensures that when a toolholder is transferred to the tool spindle the drivers of the latter can engage the grooves of the driver flange of the toolholder transferred before the locking members are withdrawn from the grooves in the flange and moved into their releasing position for performing the exchange. Thus, the perfect coaxial alignment and retention of the toolholder in the respective toolholder socket is ensured in any phase of the axial transfer motion of the tool spindle relative to the toolholder.

As described before, the holders of the locking members may also take the form of individual, preferably sector-shaped elements each fixed separately at the toolholder support. However, when the magazine is designed as a disk, a particularly advantageous embodiment is where the holders take the form of a slotted steel plate imposed upon the front face of the toolholder.

Another advantageous embodiment of the magazine provides the possibility to remove and/or insert toolholders into or from the toolholder support also by hand, for instance for the purpose of exchanging defective tools while the tool spindle is working with a toolholder withdrawn from one toolholder socket. To this end, it is advantageous to provide operating means by which the holders can be moved into their releasing position after the toolholder support and/or the magazine disk has been adjusted to bring the toolholder socket of a toolholder to be exchanged in alignment with the operating means.

Other features and details of the invention will be apparent from the following description of an embodiment shown in the drawing and of possible modifications of the design of the invention and from the claims.

BRIEF DESCRIPTION OF THE DRAWINGS

FIG. 7a is a fragmentary, enlarged, view of FIG. 7;

FIG. 11 is a longitudinal cross-section along line 11—11 in FIG. 10, illustrating operating means for controlled individual movement of the holders into their releasing position.

FIG. 1 shows a machining centre of generally conventional design, wherein the numerical 20 indicates a machine frame carrying at its rear portion a column 22. In front of the column, there is arranged on the machine frame a work table generally indicated by the numerical 24 which preferably takes the form of a cross slide.

At the front of the column a headstock generally indicated by the numerical 30 is arranged for vertical adjustment along a vertical guide frame 26 and a guide post provided in parallel arrangement to the latter. The numerical 32 indicates a bellows protecting the guide frame and the guide post above the headstock.

Figure 2:
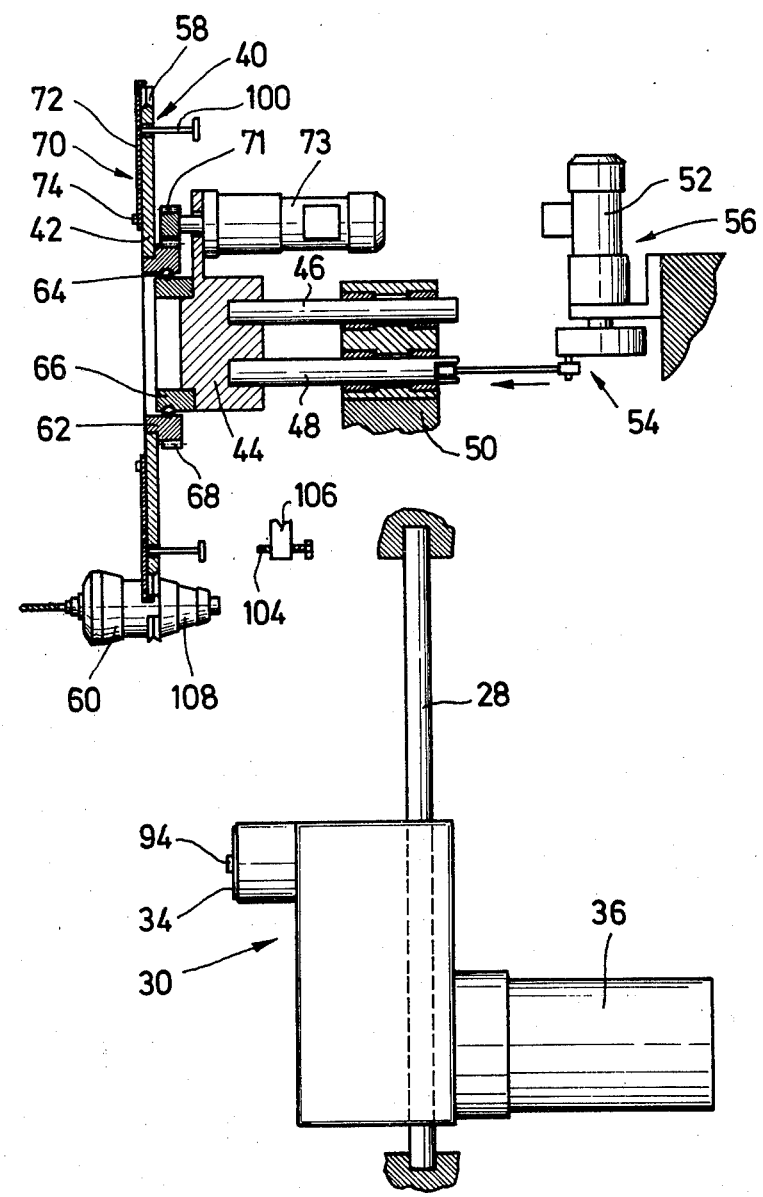
FIGS. 2 to 5 are diagrammatic views of longitudinal cross-sections through the magazine and its seating and through the headstock for the purpose of illustrating the toolholder change.

The tool spindle of the headstock, which is indicated by the numerical 34, is driven by a d.c. gear motor 36, as may be seen from FIG. 2.

The headstock 30 can be vertically displaced along the Y axis by means of a jack not shown in the drawing.

The numerical 38 indicates a switch-board receiving the components of the electrical control, such as a CNC control adapted to the operations to be performed by the machining centre, which may also contain a processor to simplify the programming, operating and maintenance work.

The numerical 40 generally indicates a magazine arranged above the headstock 30 on the column 22. The magazine 40 is conventionally equipped with a disk-shaped toolholder support 42 seated for rotation on a magazine slide 44 in coaxial relation to the tool spindle of the headstock. The magazine slide 44 is guided on a parallel guide consisting of guide rods 46, 48 for displacement in a guide body 50 of the column, with slide driving means 56 comprising a gear motor 52 and a crank assembly 54 serving to displace the magazine slide 44 and the toolholder support 42 in the latter's axial direction.

The disk-shaped toolholder support 42 is provided on its periphery with a plurality of equally spaced, radially open toolholder sockets 58, each adapted for receiving one toolholder 60 in coaxial alignment with the tool spindle. By rotating the toolholder support 42, the toolholder sockets 58 can be moved into a changing position wherein the respective toolholder is ready to be transferred to the tool spindle. In this changing position, the toolholders are in the vertical plane of movement of the headstock and adjacent to the latter.

To enable the individual toolholder sockets to be moved into the correct changing position, the toolholder support 42 is fixed against rotation on an outer bearing ring 62 of a ball bearing 64, while the inner bearing ring 66 is mounted on the magazine slide 44.

At the rear of the disk-shaped toolholder support 42, a ring gear 68 is provided on the outer periphery of the outer bearing ring 62 to coact with a drive pinion 71 of a gear motor 73 which can be actuated by the CBC control to rotate the toolholder support.

Each toolholder socket 58 of the toolholder support has associated to it toolholder locking means generally indicated by the numerical 70 which serve to secure any toolholder 60 inserted in the toolholder socket against unwanted releasing and also to maintain its parallel alignment relative to the toolspindle axis.

Figure 7:
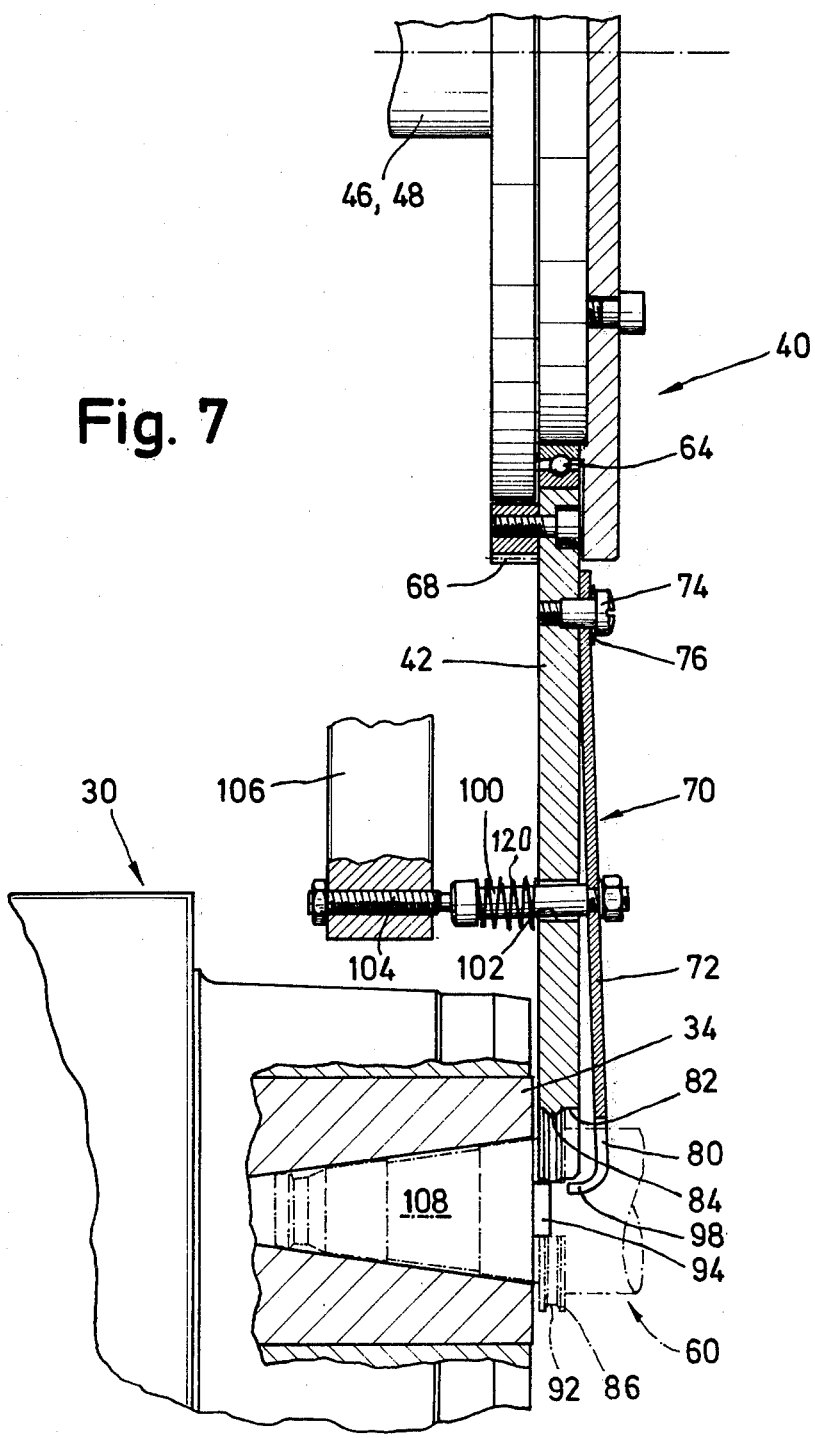
FIG. 7 is a longitudinal cross-section through the magazine along line 7—7 in FIG. 6, showing also the headstock moved in its transfer position and a first embodiment of a stop intended to move the holders into their releasing position.
Figure 8:
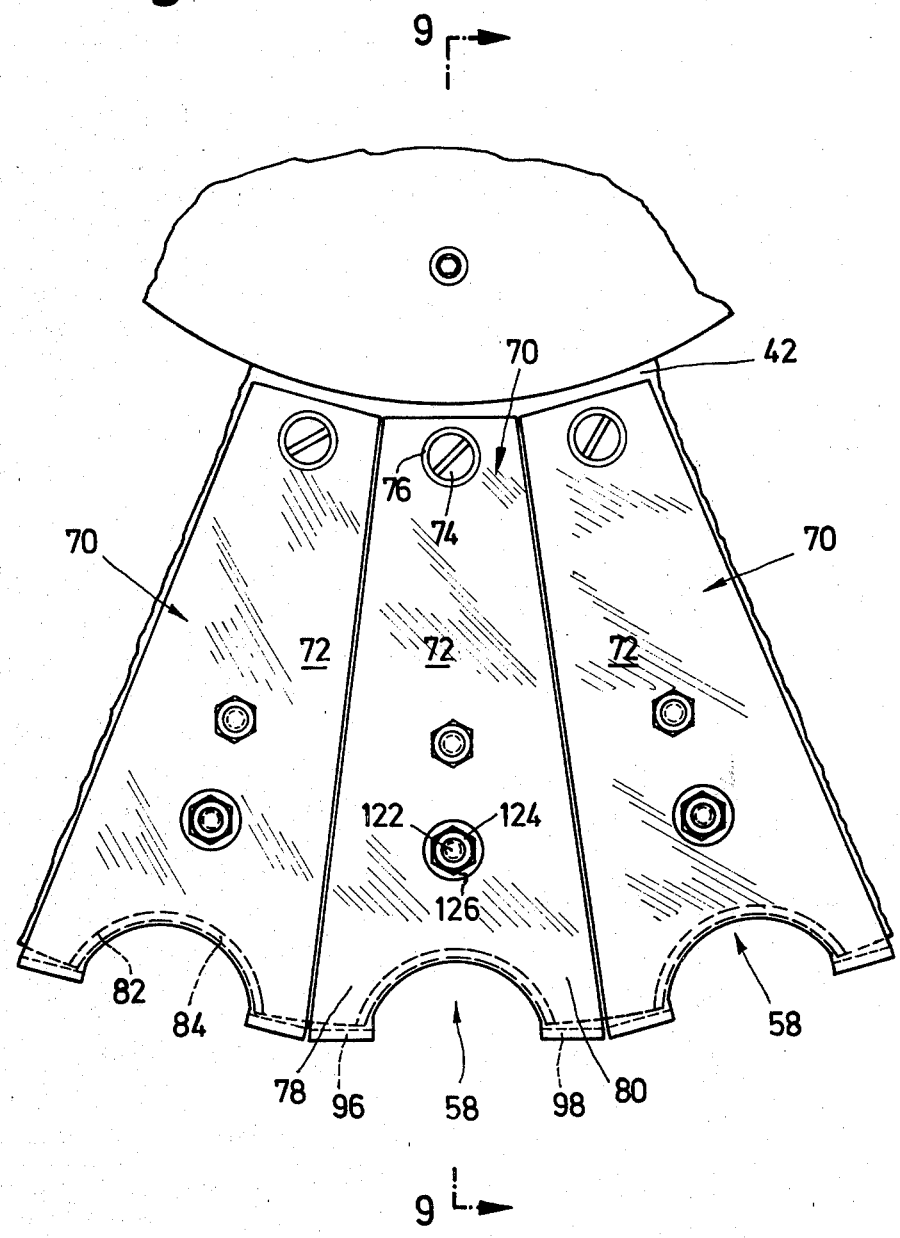
FIG. 8 is a view similar to that shown in FIG. 6, illustrating a second arrangement of the holders.

Each of the toolholder locking means comprises one preferably sector-shaped flat holder 72 per toolholder socket, the inner end face of the said holder being arranged at a certain radial distance from the axis of the toolholder support 42. The holder 72 is fastened at the toolholder support by means of a fastening screw 74 and a cup spring 76 arranged thereon so as to ensure that the free ends of the holders can be lifted off the front portion of the face of the toolholder support 42 as shown in FIG. 7.

Figure 6:
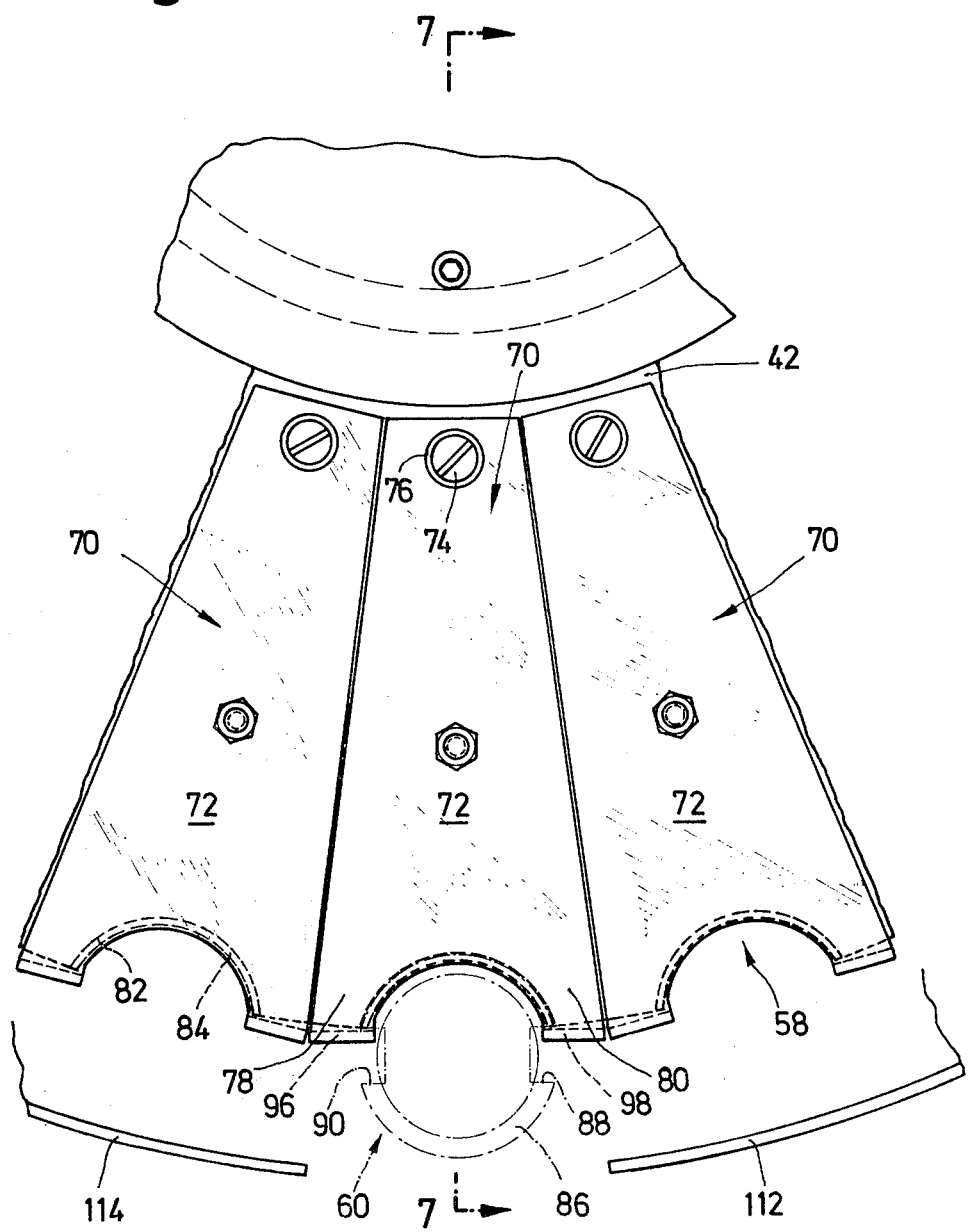
FIG. 6 is a fragmentary view of the magazine disk showing a first arrangement of holders having the locking members provided at the front faces.

The end of the holders nearest the periphery of the toolholder support takes the form of a fork, the arms 78 and 80 of which encompass a portion of the circumference of a toolholder 60 inserted in the respective toolholder socket 58 as shown in FIGS. 6 and 7a.

The toolholder sockets 58 are conventionally designed as sector-shaped recesses formed in the toolholder support 42 with a centering web 84 of trapezoidal cross-section formed along their inner face 82.

The toolholders 60 provided for being stored in the toolholder support are of uniform size and equipped with the standardized driver flange 86 having recesses 88, 90 arranged at opposite flange portions. The driver flange 86 is provided with a circumferential groove 92 which positively engages the centering web 84 when the toolholders are positioned in the toolholder sockets.

When the toolholders are positioned in the tool spindle 34, the flange recesses 88, 90 are engaged by drivers 94 provided at the side of the spindle so as to secure the toolholders in the tool spindle against rotation.

In the stored condition of the toolholders, the flange recesses 88, 90 coact with the respective toolholder locking means 70 to secure the toolholders against unwanted disengagement from the toolholder socket. At the same time, they coact with the centering web 84 to maintain the coaxial alignment relative to the tool spindle.

The fork arms 78, 80 of the holder 72 of the toolholder locking means are provided to this end with one claw-like locking member 96 and 98 each formed by end portions of the arms projecting therefrom at an approximately right angle in the direction of the toolholder support.

The said claw-like locking members engage the recesses 88, 90 in the driver flange 86 of the toolholders 60, forcing the driver flange under pressure against the centering web 84 which, due to the prismatic configuration of its cross-section and its engagement with the circumferential groove 92 of the driver flange, ensures the coaxial alignment between the toolholder and the tool spindle.

The length of the claw-like locking members 96, 98 is such that in the engaged position indicated by a dash-dot line in FIG. 7a they engage the grooves only over a certain length thereof. This offers the advantage that during the transfer of the toolholders 60 to the tool spindle—which operation will be described in detail below—the oppositely arranged drivers 94 of the tool spindle can engage the flange recesses 88, 90 without contacting the locking members 96, 98 which are still in their locking position within the flange recesses. It is the particular advantage of this special arrangement that the driver flange 86 is, in the transfer of the toolholder to the tool spindle, maintained in positive contact with the centering web 84 of the toolholder sockets 58. Thus, toolholder driver flange 86 is in perfectly coaxial alignment to the tool spindle, initially through the claw-like locking members 96, 98, then through both of the drivers 94 of the tool spindle and the locking members 96 and 98 and finally only through the drivers 94, until the respective toolholder has been completely transferred to the spindle and is securely locked therein.

So, the holders 72 with their claw-like locking members simultaneously perform the function of an aligning means in that they ensure a matching alignment between the flange recesses 88, 90 of toolholder 60 and the drivers 94 of the spindle.

As has been explained above, the function of holding the driver flange 86 during the transfer of a toolholder to the tool spindle is in the final phase of the changing process performed by the drivers 94 alone. This means that the claw-like locking members 96, 98 of the respective holder 72 must be withdrawn from the recesses in the flange while the drivers 94 engage the recesses in the driver flange 86. This is also necessary to enable the toolholder and/or its driver flange to be withdrawn radially from the respective toolholder socket 58 of the toolholder support 42 when the toolholder has been fully received by the tool spindle.

The withdrawal of the locking members 96, 98 from the flange recesses 88, 90 is positively controlled. To this end, each holder 72 has fastened, for instance, to its rear a preferably lug-shaped stop member 100 projecting with a certain radial play through a bore 102 in the toolholder support 42.

All stop members 100 of the holders 72 coact with one common stop taking the form of an adjustable set screw 104 provided on a stationary stop support 106, the set screw 104 being positioned in the vertical plane of movement of the tool spindle.

For the purpose of changing the toolholder, the disk-shaped toolholder support 42 performs among other movements an axial movement to the left—as viewed in FIG. 7—so that the stop member 100 of the holder 72 which together with the toolholder to be exchanged has been brought into the lower changing position is in alignment with the set screw 104.

Now, when due to this axial movement of the toolholder support the toolholder shaft 108 engages the tool spindle, the stop member 100 will approach the set screw 104 and eventually come into contact with the latter in the final phase of this axial movement. As a result thereof, the holder 72 will be displaced and lifted off the toolholder support 42—as shown in FIG. 7—limited by the inherent elasticity of the holder 72 and the fastening screw 74.

The position of the set screw 104 has been selected to ensure that the locking members 96, 98 will disengage the flange recesses only when—as described above—the drivers 94 of the tool spindle have entered the flange recesses sufficiently far to be able to keep themselves the driver flange in matching engagement with the centering web 84.

Hereafter, the operation of a toolholder exchange will be described in detail with reference to FIGS. 2 to 5.

FIG. 2 shows that no toolholder is positioned in the tool spindle and that a toolholder 60 stored in the magazine 40 has been brought into the lower changing position with the aid of the CNC-control of the machine. The tool, for instance a drill, is to perform the first machining operation of the respective programme. The headstock 30 is still in a lower initial position.

Figure 3:
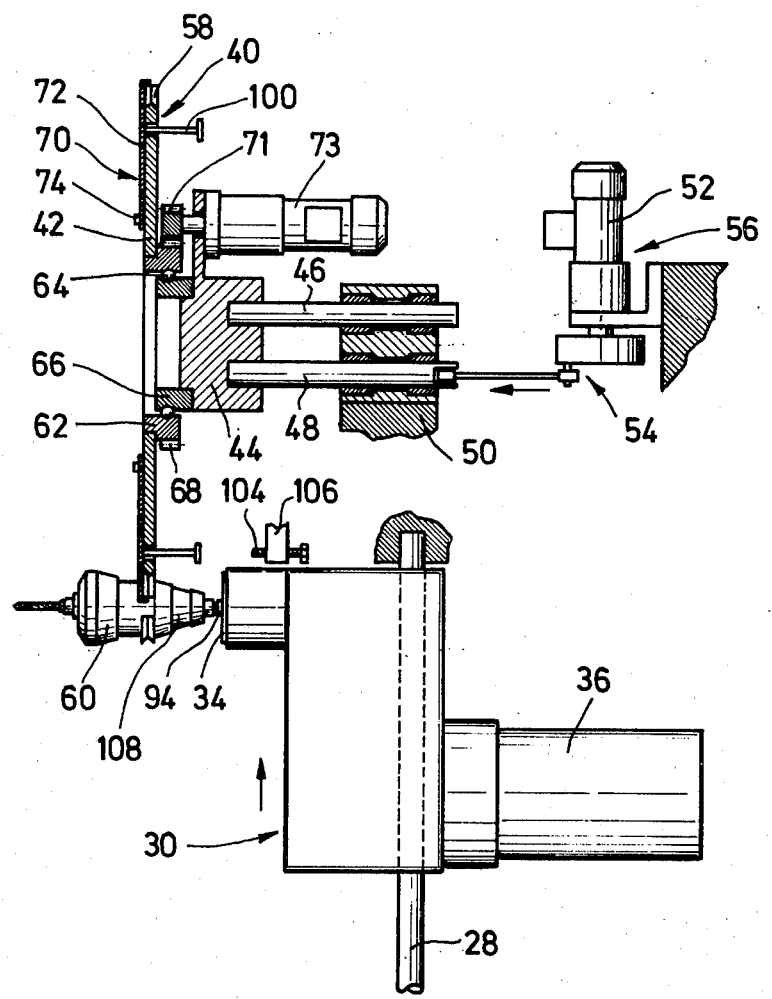

For the purpose of transferring the toolholder to the tool spindle, the magazine 40 is first moved to the left—as viewed in FIG. 3—into a waiting position through the slide driving means 56 which is actuated by the CNC control. Thereafter, the headstock 30 moves into its transfer position in which the tool spindle 34 is positioned behind the waiting toolholder 60 and in exact alignment therewith.

Figure 4:
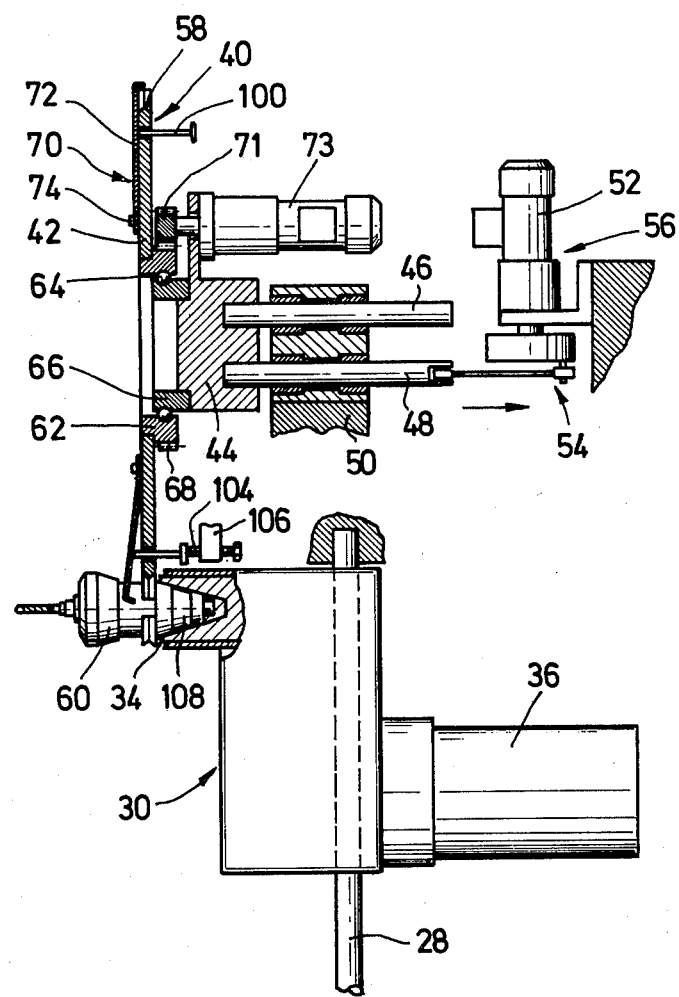

Finally, as shown in FIG. 4, the magazine 40 is caused by the slide driving means 56 to move in the opposite direction for the purpose of transferring the toolholder 60 so that the shaft 108 of the toolholder 60 engages the tool spindle.

During the initial movement, as shown in FIGS. 2 and 3, the locking members 96, 98 remain initially in engagement with the flange recesses 88, 90 even when the spindle drivers 94 are already entering the latter. In the final phase of this movement of the magazine 40, as shown in FIG. 4, the stop member 100 then contacts the set screw 104 which causes the locking members 96, 98 to be lifted off the flange recesses.

Simultaneously, the shaft 108 of the toolholder is clamped within the tool spindle. Due to the fact that the toolholder is released by the holder 72 or the latter's locking members, the headstock may thereafter be moved downwardly into its working position, thereby disengaging the driver flange of the toolholder from the toolholder socket as shown in FIG. 5.

Figure 5:
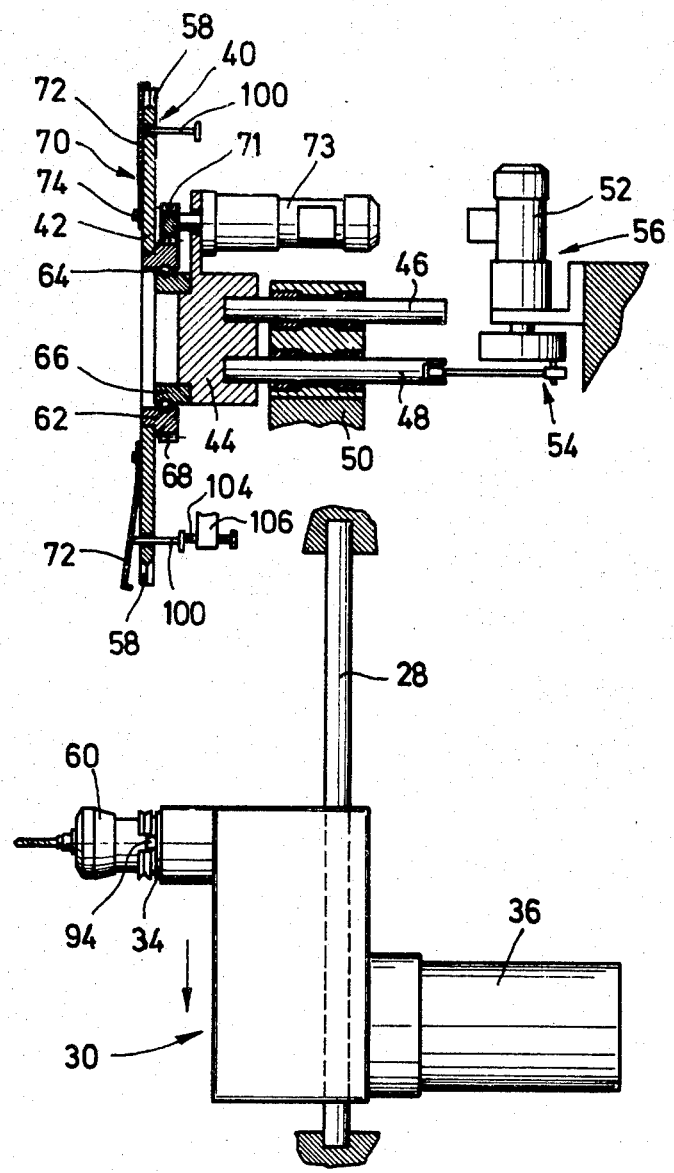

From FIG. 5 it can be seen that the toolholder support 42 remains in its transfer position until the tool is no longer employed and the toolholder is returned into the magazine. To this end, the headstock moves again in the direction of the magazine 40 when the corresponding machining operation has been terminated, thus causing the driver flange of the toolholder to get into positive engagement with the toolholder socket 58 of the toolholder support. After the toolholder shaft has been unlocked in the tool spindle, the magazine 40 is then moved to the left—as viewed in FIG. 3—and during this motion the locking members of the holder 72 are again brought into engagement with the flange recesses 88, 90 of the drive flange so that the toolholder is again securely held in the tool socket. Thereafter, the toolholder support may be rotated by the gear motor 73 to present the tool which according to the operating programme will be used next, and the cycle described above will be repeated for the purpose of transferring another toolholder to the tool spindle.

Figure 1:
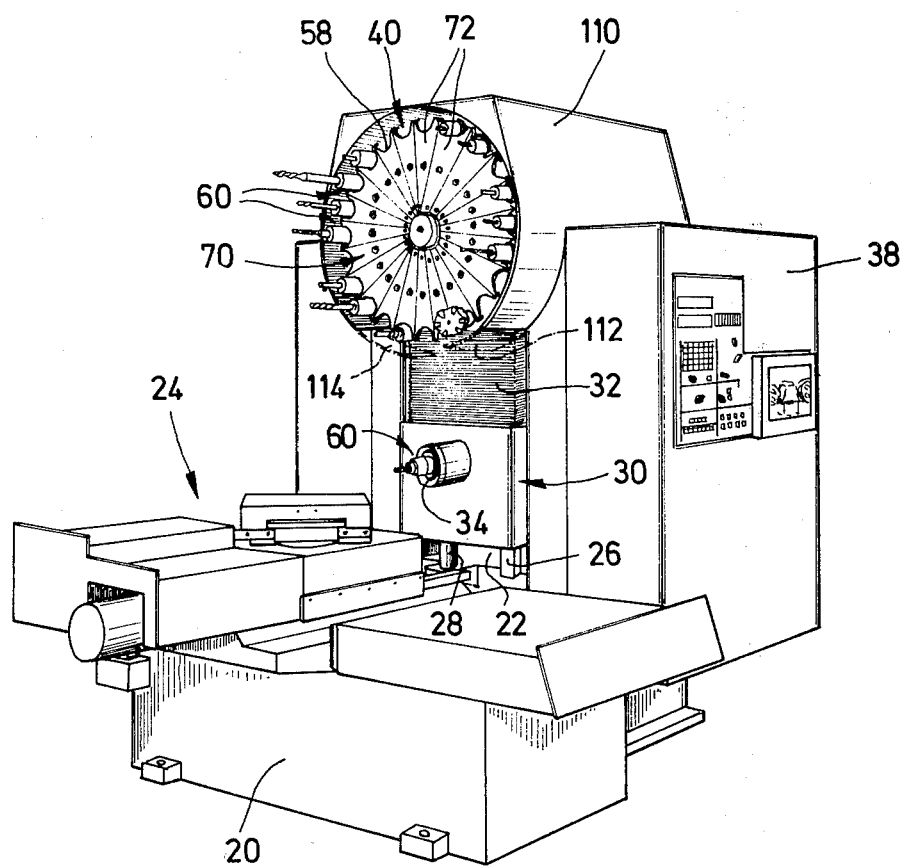
FIG. 1 is a diagrammatic view of a machining centre equipped with a magazine of the invention in disk-shaped configuration.

As shown in FIG. 1, the magazine 40 is arranged within a housing 110 in which the toolholder support 42 is almost fully enclosed.

As shown in FIG. 5, the holder 72 of the toolholder socket 58 remains in its changing position lifted off the toolholder support 42 as long as the toolholder 60 withdrawn from this toolholder socket remains in the tool spindle.

In the lower portion of the housing 110 segmentally shaped safety rails 112, 114 may be provided to coact with the toolholder support. The function of these rails is to shield all toolholder sockets, except the one which is at any time in the changing position. The arrangement of such safety rails should be such that they follow all axial movements of the toolholder support 42. Therefore, they must be suitably mounted—in a manner not shown in the drawing—for instance at the magazine slide 44.

Figure 9:
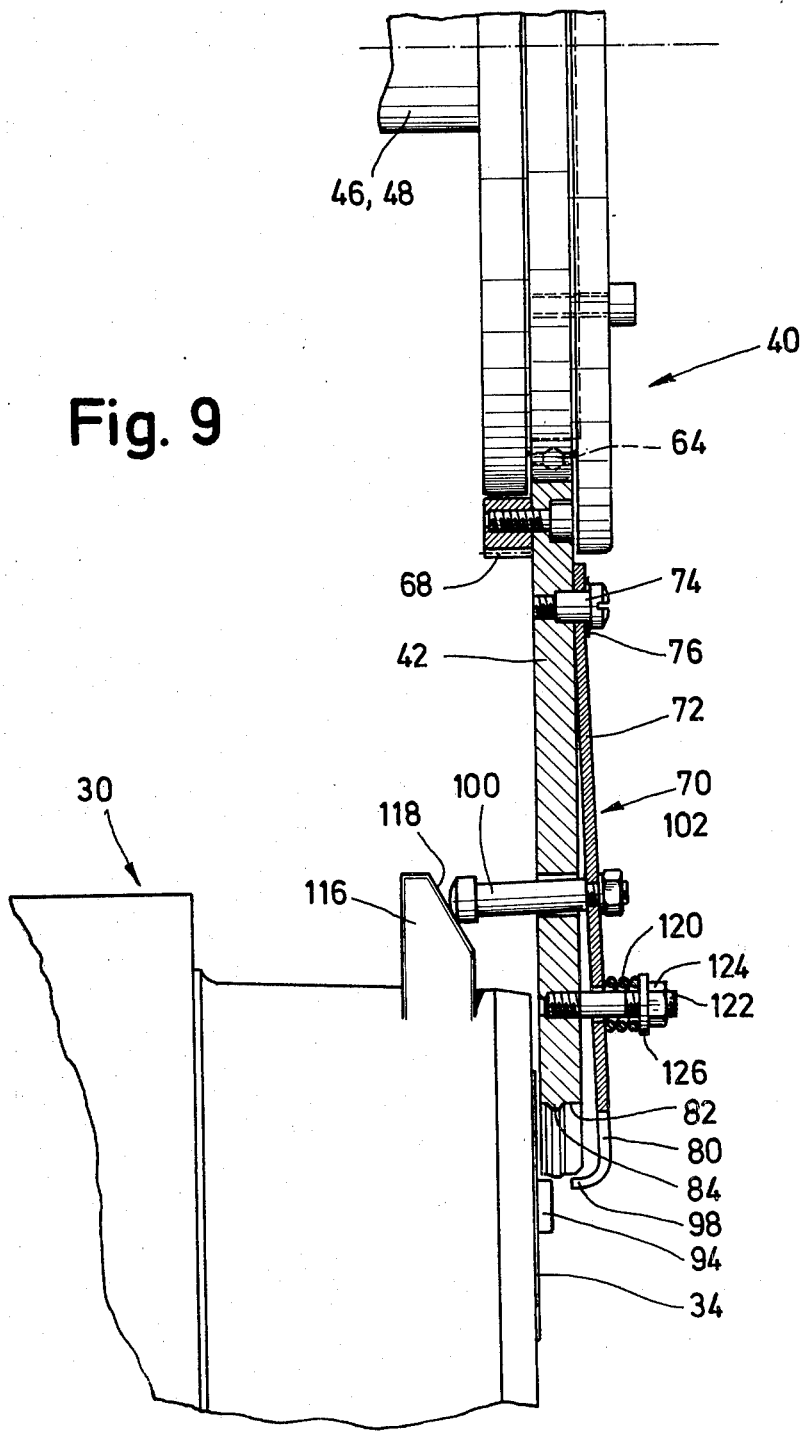
FIG. 9 is a longitudinal cross-section through the magazine along line 9—9 in FIG. 8, showing also another embodiment of a headstock moved into its transfer position with a second embodiment of a stop for the operation of the holders.

FIG. 9 shows a design in which, contrary to the design shown in FIG. 7, the stop indicated by the numerical 116 coacting with the stop members 100 of the holders 72 is formed as an integral part of the headstock and provided with a sloping face 118 which will abut against the stop member of the holder 72 in the changing position as soon as the headstock reaches it upper changing position. This means that the holder 72 is released again by the stop 116 and can return into contact with the front portion of the toolholder support when the headstock descends again into its working position after a toolholder has been transferred.

In an improved embodiment of the magazine, one return spring 120 is associated with each holder 72. These springs tend to maintain the holders constantly in their locked position or in full-surface contact with the toolholder support. For this purpose, the holders are penetrated by a screwed-in spacer bolt 122 carrying the return spring 120 in the form of a pressure spring acting on the one hand against the outer face of the respective holder and, on the other hand, against a washer 126, held by by a threaded nut 124. However, it is also possible—as shown in FIGS. 7 and 7a—to arrange such a return spring 120 directly on the arc-shaped pin member 100 of the holders 72 so that it bears on the one hand against the rear face of the holder and, on the other hand, against a shoulder of the stop member.

Figure 10:
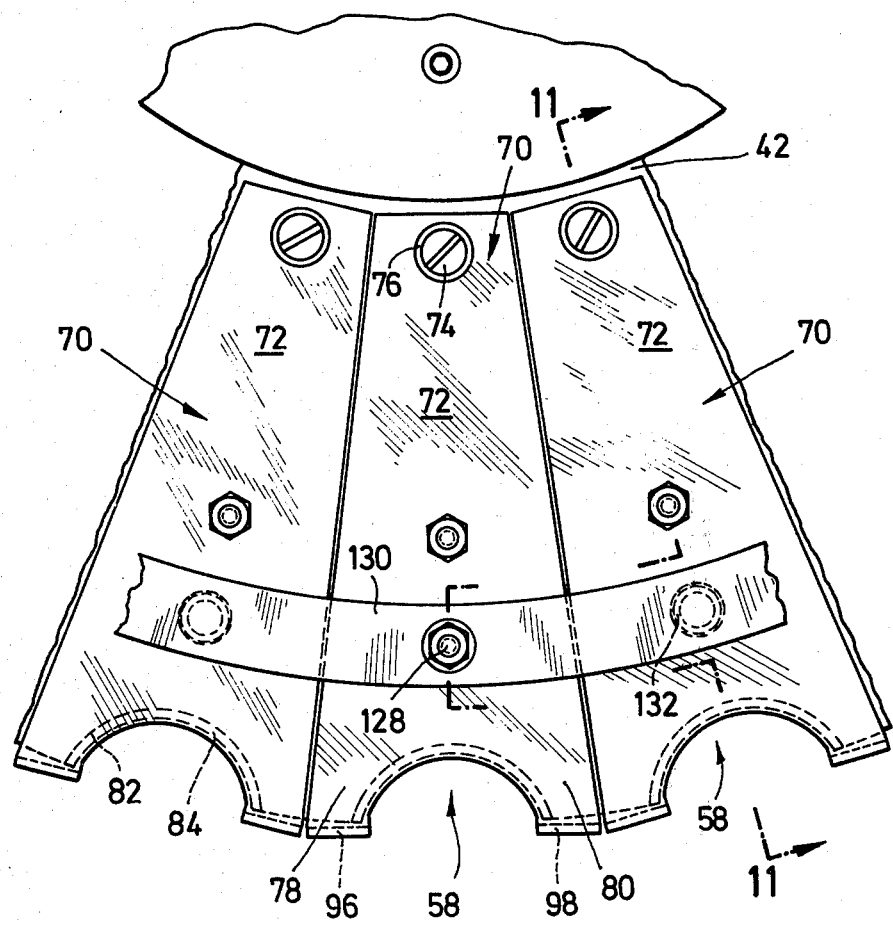
FIG. 10 is a view similar to that shown in FIG. 8 illustrating a third arrangement of the holders at the magazine.

FIG. 10 shows an alternative to the arrangement of the return springs in accordance with FIG. 9. In this case, a supporting ring 130 provided in front of the holders 72 is arranged for instance on four spacer bolts 128 provided at angular distances of 90° in an arrangement analogous to that of the spacer bolt arrangement of FIG. 9. Between each holder and the supporting ring a pressure spring 132 is provided which tends to maintain the holder in constant contact with the front face of the toolholder support.

In addition, the design of the magazine is such to permit the manual insertion and withdrawal of toolholders into or from the toolholder sockets. For this purpose, stationary operating means indicated generally by the numerical 134 are provided, by way of example, adjacent the stop support 106 or the changing position. The operating means take for instance the form of an air jack with a stop 138 provided on its piston rod 136. The piston rod is secured against rotation by means of a guide rod 140 extending through the stop.

For the purpose of exchanging a toolholder by hand, the operating means must be actuated to cause the stop 138 to move the holder 72 securing the toolholder to be exchanged into its releasing position. When the toolholder has been positioned in the corresponding toolholder socket 58, the stop 138 must be moved back into its releasing position so that the pressure spring 132 will automatically cause the respective holder 72 to return into its locking position.

What we claim is:

1. A tool holder support assembly for use in association with a machine tool, having a machine bed, a column assembly mounted on said machine bed, a tool spindle and slide assembly slidably mounted on said column assembly, a base having a worktable mounted adjacent said column assembly; the tool holder support assembly mounted on said column assembly for storing tool holders with a flanged end including a peripheral groove therein and opposite side recesses, the combination comprising: a tool holder magazine having an outboard face in a vertical plane, means for supporting said magazine for indexed movement into tool changing positions with respect to the tool spindle, said magazine having a peripheral edge configured to form a plurality of spaced, peripheral tool holder sockets on said magazine, each of said tool holder sockets including a semicircular centering web adapted to engage the peripheral groove on the flanged end of a tool holder when supported by said magazine, a plurality of spaced, flat sector shaped tool holder means having opposite ends, means mounting one end of each of said tool holder means on said tool holder magazine at the outboard face thereof, each of said tool holder means having a semicircular tool holder socket formed at the other end thereof, said tool holder means further including a pair of arms located on opposite sides of the circumference of a tool holder engaged by said centering web, a locking means mounted on each of said arms selectively movable into the side recesses of the flanged end of a tool holder for locking a tool holder in said magazine by urging the flanged end thereof in a direction to cause the peripheral groove thereof to be held on one side by said centering web, each of said locking means including a bent end portion on each of said arms directed inboard of one of said magazine sockets so as to seat in the side recesses of a tool holder, thereby to securely lock the tool holder in engaged relationship with said centering web so as to prevent tilt of the tool holder from a para-axial alignment with the tool spindle when a tool holder is loaded to or from the tool spindle, and operating means independent of the tool spindle for moving each of said tool holder means from a locking position in juxtaposed position with said outboard face into a release position spaced from said outboard face to unlock each of said tool holders from said magazine.

2. A machine tool as defined in claim 1, characterized in that each of said tool holder means are defined as sectors, fastener means on each of said sectors connecting said one end thereof to said magazine disk at a distance spaced from said peripheral edge, stop member means, and a pin member mounted on each of said tool holder means between said fastener means and said tool holder means, said pin member projecting through said magazine and adapted to coact with said stop member means for moving each of said tool holding means into a release position.

3. A machine tool as defined in claim 1, characterized in that said stop member means is mounted on the machine frame independent of the tool spindle and in a vertical plane of movement of the tool spindle.

4. A machine tool as defined in claim 1 characterized in that said stop member means includes a sloping face adapted to coact with said pin member during relative movement between said magazine and the tool spindle for the purpose of transferring a tool holder from said magazine to the tool spindle.

* * * * *